Nov. 10, 1964    J. M. CAUGHEY    3,156,461
TERMINAL CONNECTIONS FOR LINEAR SPRING ELEMENTS
Filed June 14, 1963    2 Sheets-Sheet 1
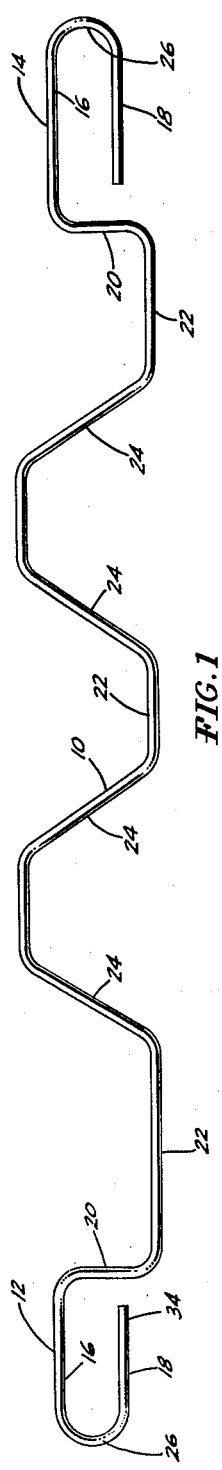
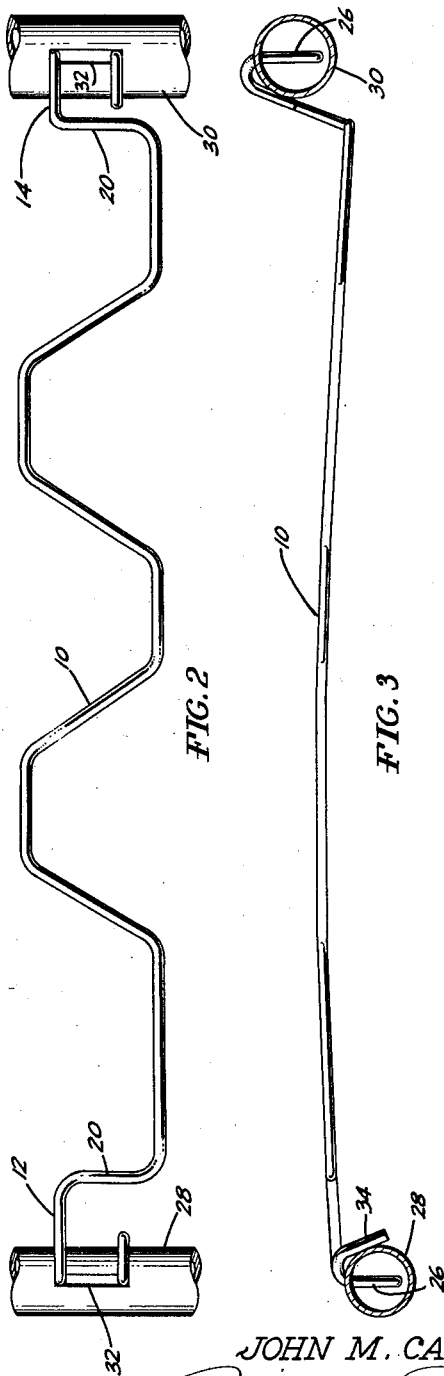
INVENTOR
JOHN M. CAUGHEY
BY Beaman & Beaman
ATTORNEYS Nov. 10, 1964   J. M. CAUGHEY   3,156,461
TERMINAL CONNECTIONS FOR LINEAR SPRING ELEMENTS
Filed June 14, 1963   2 Sheets-Sheet 2
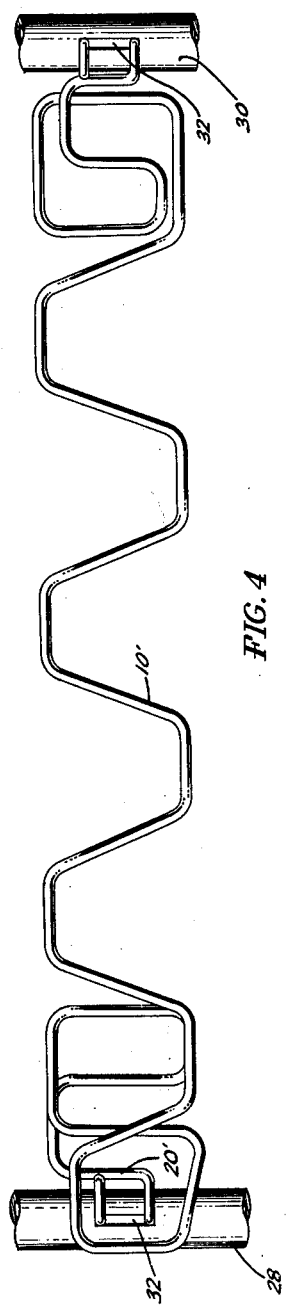
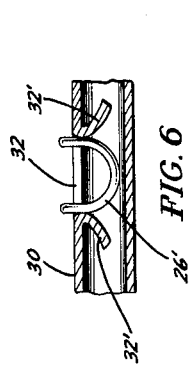
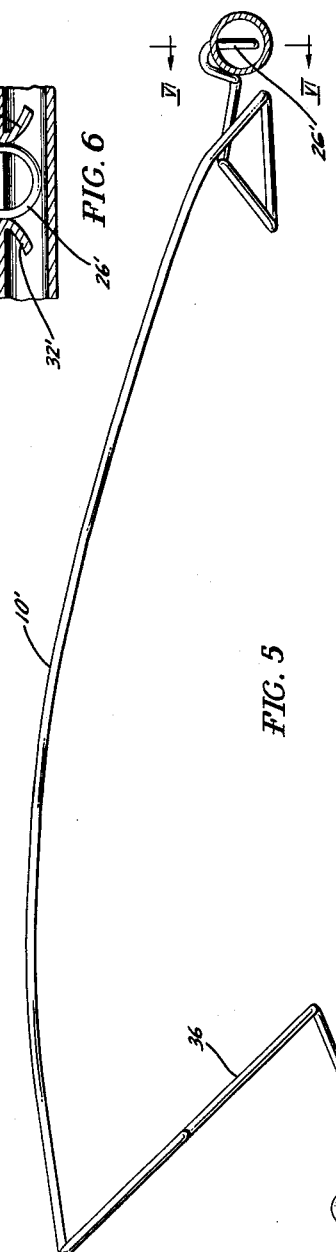
INVENTOR
JOHN M. CAUGHEY
BY Beaman & Beaman
ATTORNEYS United States Patent Office 3,156,461
Patented Nov. 10, 1964

3,156,461
TERMINAL CONNECTIONS FOR LINEAR
SPRING ELEMENTS
John M. Caughey, Adrian, Mich., assignor to Stubnitz
Greene Corporation, a corporation of Michigan
Filed June 14, 1963, Ser. No. 288,037
4 Claims. (Cl. 267—110)

The present invention relates to improvements in terminal connection structure for linear spring elements of vehicle and furniture cushion springs, being an improvement of the structure disclosed in my application Serial No. 185,967, filed April 9, 1962, now Patent No. 3,127,159, March 31, 1964.

It has been found in practice that the terminal connections of the aforesaid applications cannot be practically used with linear spring elements which are not provided with fishmouth, or other form, which will enable the terminal connection to be inserted in the described manner. For example, the terminal connection of said application cannot be conveniently used where the linear spring element is of a design in which the load supporting surface of the linear spring element is substantially disposed in the plane of the spaced, opposed frame members.

According to the present invention, the terminal connection consists of a simple U-shaped portion having substantially parallel leg portions which are spaced overall an amount slightly greater than the width of the slot in the tubular frame member. One or both of the leg portions having continuation portions which are return bent to bear upon the exterior, inward surface of the tubular member to stabilize the frictional snap-in association of the terminal connection between the U-shaped portion of the linear spring element and the slot in the tubular frame member.

Thus, an object of the invention is to provide a terminal connection between a linear spring element and a slotted tubular frame of a design which will permit the connection to be established without twisting or distorting the spring element, the assembly being accomplished solely by movement of the spring element in a direction normal to a plane through the spaced opposed frame members in which the spring element is supported in bridging relation.

Another object of the invention is to provide a terminal connection in which a U-shaped end portion of the spring element has a frictional, snap-in association with a slot in the tubular frame member, the connection being stabilized by one or more portions engaging the exterior, inward surface of the frame member.

A still further object is to provide a slot and U-loop connection between a tubular frame and a spring wire element, the U-loop of the spring element being in frictional, snap-in association with an elongated slot in the frame, the length of the slot being slightly less than the unstressed overall width of the U-loop and the width of the slot being slightly greater than the diameter of the spring wire.

These and other objects and advantages of the invention will more fully appear from the following specification and the appended claims.

In the drawings,

FIG. 1 is a plan view of a spirng wire blank prior to forming the terminal portion, FIG. 2 is a plan view showing the blank of FIG. 1 with the terminal portions formed and associated in the slots of tubular frame member, FIG. 3 is a side elevational view of the assembly of FIG. 2 in which the spring element is shown with its load-supporting surface substantially disposed in the plane of the spaced, opposed frame member, FIG. 4 is a view similar to FIG. 2 of a spring element of different form, FIG. 5 is a side elevational view of FIG. 4 showing the load-supporting surface of the spring element as being disposed in offset relation to the plane of the frame member by the presence of a fishmouth form, and FIG. 6 is a section taken on VI—VI of FIG. 5 showing the terminal connection between the terminal ends of the spring elements of FIGS. 1 through 5 with their respective slotted tubular frame members.

Referring to the form of the invention of FIGS. 1 through 3, the linear spring element 10 is shown as a blank in FIG. 1 as formed from a length of spring wire prior to the final forming of the terminal portions 12 and 14. The terminal portions 12 and 14 take the form of U-loops having parallel leg portions 16 and 18, the leg portions 16 being right angle extensions of the transverse torsion bar portions 20. The load-supporting portion of the spring element 10 is located between the portions 20 and it may be sinuous, as shown, with spacer portions 22 and angular torsion bars 24, or other desired form including merely a straight wire portion connecting the torsion bar portions 20.

As shown in FIGS. 2 and 3, following the final forming of the terminal portions 12 and 14, the U-loop portions 26 are disposed substantially 90° to a plane through the spaced, opposed frame members 28 and 30 of the cushion structure. Slots 32, preferably lanced, in the tubular frame members receive the U-loop portions 26 to support the spirng element 10 in bridging relation to the frame members.

To help stabilize the terminal connection between the element 10 and frame members, the end 34 of each leg portion 18 is formed, as shown in FIG. 3, to extend inwardly and downwardly so as to bear upon the inward surface of its frame member.

It will be obvious that the shape of the terminal portions of the spring element 10 will enable the element 10 to be readily assembled in the frame members 28 and 30 by bodily downward movement toward the plane of the members 28 and 30, with the U-loops 26 aligned with the holes in the frames.

In practice the slots are slightly less in length than the unstressed overall dimension across the legs 16 and 18 of the terminal portions 12 and 14. This results in a frictional, snap-in association of the U-loop portions in the slots 32 with the rounded leading end of the U-loop portions facilitating insertion into the slot. More specifically, with the spring element of 8 gauge wire (.162") satisfactory results have been obtained in commercial use in vehicle cushion spring structure with the length of the slots 1.000", an overall unstressed width of the U-loop portions 1.090", and the width of the slots .1875".

Vibration tests have determined that the frictional snap-in association of the U-loop portions 26 in the slots 32 will be permanent in service and silent in operation. In production, the elements 10 may be readily inserted into the frame members 28 and 30 without special manipulation of the elements or without the use of special tools.

FIGS. 4 and 5 illustrate the use of the terminal connection of FIGS. 1 through 3 as applied to the element 10' having a fishmouth form at 36. Thus, the present invention may be used with spring elements of the fishmouth form as a substitute for the terminal structure of the aforesaid application.

In FIG. 6 the slot 32 is shown in more detail. Preferably a lancing operation is used to form the slot 32 as it eliminates the loose slug problem with the tubular frame members. Also, by rounding back the ends 32', during the formation of the slot 32, the ends of the slot 32 have broad rounded faces which increase lateral stability of the spring element and facilitates insertion as well as intentional removal of the spring element 10.

Having thus described my invention, what I claim is new and desire to protect by Letters Patent is:

1. A cushion spring structure having in combination, a pair of spaced opposed frame members of which at least one has an elongated slot, a linear spring wire element supported in bridging relation from said frame members, at least one end of said element having a U-looped terminal portion disposed in said slot, the parallel legs of said U-looped terminal portion having an overall unstressed dimension slightly in excess of the length of said slot whereby said leg portions have a frictional, snap-in association with said slot, said slot opening outwardly substantially normal to a plane through said members, said U-looped terminal portion being disposed substantially normal to said plane whereby the connection between said slot and said U-looped terminal portion may be established solely by bodily movement of said element toward said plane.

2. In the combination of claim 1, said members each having slots and said element having U-looped end portions at opposite ends to be received in said slots.

3. In the combination of claim 1, wherein said spring element is substantially disposed in the plane of said members.

4. In the combination of claim 1, wherein one of said legs being a direct continuation of the frame-bridging portion of said element and the other of said legs having a returned bent continuation portion engaging the exterior, inward surface of its frame member to stabilize said frictional, snap-in connection.

References Cited by the Examiner
UNITED STATES PATENTS

| | | | |
|---|---|---|---|
| 2,549,655 | 4/51 | Woodward | 287—20.1 X |
| 2,870,823 | 1/59 | Staples | 5—260 X |
| 2,969,155 | 1/61 | Atkinson | 287—20.1 X |
| 3,008,555 | 11/61 | Neely | 5—260 X |

ARTHUR L. LA POINT, *Primary Examiner.*